United States Patent [19]

Thorsrud et al.

[11] 4,360,607

[45] Nov. 23, 1982

[54] MICROWAVE ENERGY SENSITIZING CONCENTRATE

[75] Inventors: Agmund K. Thorsrud; Roy W. Siedenstrang, both of Stow, Ohio

[73] Assignee: Phillips Petroleum Company, Bartlesville, Okla.

[21] Appl. No.: 72,396

[22] Filed: Sep. 4, 1979

[51] Int. Cl.$^3$ .............................................. C08L 25/10
[52] U.S. Cl. .................................. 523/137; 524/247; 524/249; 524/368; 524/376; 524/377; 524/388; 524/505
[58] Field of Search ...................... 260/32.6 R, 32.6 A, 260/33.6 AQ, 33.2; 264/25; 252/600; 525/1, 6; 523/137; 524/388, 376, 377, 368, 249, 247, 505

[56] References Cited

U.S. PATENT DOCUMENTS

| | | |
|---|---|---|
| 3,371,130 | 2/1968 | Seifert et al. |
| 3,408,320 | 10/1968 | Brucksch ......................... 260/33.2 R |
| 3,542,904 | 11/1970 | Weitzel et al. ................... 260/33.2 R |
| 3,624,189 | 11/1971 | Goldman ................................. 264/25 |
| 3,625,915 | 12/1971 | Gubler et al. ................... 260/28.5 B |
| 3,823,109 | 7/1974 | Middlebrook .................. 260/23.7 R |
| 3,826,776 | 7/1974 | Wright ............................... 260/42.47 |

FOREIGN PATENT DOCUMENTS

| | | |
|---|---|---|
| 1103284 | 3/1961 | Fed. Rep. of Germany . |
| 1184950 | 1/1965 | Fed. Rep. of Germany . |
| 1345656 | 11/1963 | France . |
| 867176 | 5/1961 | United Kingdom . |

OTHER PUBLICATIONS

Rubber Chemistry and Technology; Mar. 1971; vol. 44, No. 1, pp. 294-306.

*Primary Examiner*—Lewis T. Jacobs

[57] ABSTRACT

A composition of matter suitable for sensitizing thermoplastic compositions to the heating effects of microwave energy in which the components of the composition are (1) an alcohol amine or derivative thereof; (2) a simple or polymeric alkylene glycol or derivative thereof; (3) silica; and (4) optionally, a plastomer that is a normally solid linear or radial teleblock copolymer derived from butadiene and styrene. A method for preparing this composition as a dry, free-flowing powder by preparing a liquid mixture of the polymeric alkylene glycol or derivative and the alcohol amine or derivative which mixture is then charged into a premixed combination of granulated plastomer, if used, and silica. A method for preparing flow molding compounds by admixing a non-polar thermoplastic with a sufficient amount of the sensitizer composition to provide microwave energy sensitivity. Subjecting the flow molding composition, in a mold, to microwave energy thereby producing a flow molded composition.

15 Claims, No Drawings

MICROWAVE ENERGY SENSITIZING CONCENTRATE

BACKGROUND OF THE INVENTION

This invention relates to molding compositions. In one of its aspects this invention relates to thermoplastic molding compositions. In another of its aspects this invention relates to a method for molding thermoplastic molding compositions using energy of microwave frequency. In still another aspect of the invention it relates to sensitizing thermoplastic molding compositions so that energy of microwave frequency can be used in the molding process. In yet another aspect the invention relates to objects molded of thermoplastic molding compositions.

It has been discovered as set out in copending application Ser. No. 825,175, filed Aug. 17, 1977 now U.S. Pat. No. 4,288,399, that microwave energy can be used to increase the temperature of polymer/resin compositions containing polar compounds so that the temperature is raised above the softening point and low pressure molding is possible. It has been found, however, that polar compounds useful in thermoplastic compositions used in low pressure moldings must be selectively chosen. Surprisingly, the discovery has been made that a sensitizer concentrate in the form of a free-flowing dry powder can be prepared which can be readily dry blended with other components to form a thermoplastic composition suitable for molding using microwave energy. The sensitizer concentrate contains polarizing agents along with other components to produce a free-flowing dry powder. Test results show that the use of a sensitizer concentrate provides better moldability than the separate addition of the sensitizer concentrate components under the same molding conditions and that the product of the molding exhibits greater transparency. Such characteristics greatly enhance the desirability of producing molded articles under low pressure (flow molding) conditions using microwave energy to obtain a variety of articles including laminates, foot wear, automobile mats, and the like.

It is therefore an object of this invention to provide sensitizer compositions which can be mixed with non-polar thermoplastic compositions to render the admixture susceptible to the heating effects of microwave energy so that the compositions will become softened. It is another object of this invention to provide a method for producing heat molding compositions containing non-polar thermoplastics by the addition of sensitizer concentrates to the thermoplastics. It is still another object of this invention to provide flow moldable compositions containing non-polar thermoplastic and sensitizer concentrates. It is still another object of this invention to provide molded objects produced from moldable compositions containing sensitizer concentrates.

Other objects, aspects and the various advantages of this invention will become apparent upon reading this application and the appended claims.

STATEMENT OF THE INVENTION

Compositions are provided which on addition to non-polar thermoplastic compositions are suitable for sensitizing the thermoplastic compositions to the heating effects of microwave energy. The sensitizer compositions comprise, in combination, (1) simple and polymeric alkylene glycols and their mono- and dialkyl ethers and (2) alcohol amines such as ethanolamines or isopropanolamines, and their hydrocarbyl-substituted derivatives along with optionally, (3) silica and optionally, (4) a plastomer that is a linear or radial teleblock copolymer of butadiene and styrene.

In another embodiment of the invention a method is provided for preparing the sensitizer composition described above as a dry, free-flowing powder. The method comprises charging granulated plastomer, when used, and silica to an operating mixer to obtain a first mixture. To the first mixture is charged a second mixture of glycol compounds and alcohol amine compounds which has been prepared at a temperature sufficient to assure that the second mixture is liquid. Admixing the ingredients in this order provides a free-flowing, dry composition.

In another embodiment of the invention molding compositions are prepared by mixing a sensitizing amount of the sensitizing composition described above with non-polar thermoplastic and, optionally, other polymers chosen from the copolymers and generally solid resinous polymers of a vinyl-substituted aromatic compound.

In another embodiment of the invention molded objects are produced from the molding compositions described above.

The non-polar thermoplastics useful in practicing this invention are normally solid linear and radial teleblock copolymers which characteristically exhibit high tensile strength and elongation in their natural condition, e.g., nonvulcanized state. The copolymers are described in more detail in U.S. Pat. Nos. 3,823,109; 3,826,776 and 3,959,545. Particularly suitable are copolymer elastomers derived from butadiene and styrene in which the butadiene to styrene ratio can vary from about 85:15 to about 45:55 parts by weight and which contain from about 10 to about 55 weight percent of the styrene incorporated as terminal polystyrene blocks.

The amount of the thermoplastic employed in the compositions constitutes from about 30 to about 100 weight percent of the total polymers utilized in preparing the compositions.

The other polymers employed in forming the compositions, from about 0 to about 70 weight percent of total polymer utilized, are generally solid resinous polymers of a vinyl-substituted aromatic compound, e.g., styrene, alpha-methyl styrene, etc., alone or copolymerized with a monomer such as acrylonitrile or a conjugated diene such as butadiene. Such homopolymers and copolymers generally have densities in the range from about 1.04 to about 1.10 g/cc (ASTM D 792), a tensile strength in the range from about 5,000 to about 12,000 psi (34.5–82.7 MPa), ASTM D 638, and a Shore A Hardness ranging from about 35 to about 95 (ASTM D 224) at about 23° C.

In general, the thermoplastic elastomers and other polymers described above are the non-polar thermoplastics for which the combination of components named below provide sensitizing for microwave heating. The same thermoplastic elastomers described above, however, are useful as plastomers in the sensitizer concentrates. Particularly suitable copolymers are those derived from butadiene and styrene in which the butadiene to styrene ratio can vary from about 85:15 to about 55:45 parts by weight and which contain from about 10 to about 55 weight percent of the styrene incorporated as terminal polystyrene blocks.

The polar compounds (polarizing agent) employed in the invention compositions are normally liquid or solid in nature and are selected from among simple and polymeric alkylene glycols and their mono- and dialkyl ethers, ethanolamines and isopropanolamines and their hydrocarbyl-substituted derivatives and mixtures thereof. Exemplary compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having weight average molecular weights ranging from about 200 to about 6,000; polypropylene glycols having weight average molecular weights ranging from about 400 to about 2,000; mixed poly(ethylene)-poly(propylene) glycols having weight average molecular weights ranging up to about 6,000 and containing from about 30 to about 90 weight percent ethylene oxide; the monomethyl, monoethyl and monobutyl ethers of ethylene glycol, propylene glycol and diethylene glycol, the monomethyl and monoethyl ethers of triethylene glycol; the dimethyl and diethyl ethers of diethylene glycol, dipropylene glycol and trimethylene glycol; the alkanolamines and substituted alkanolamines based on ethanol and isopropanol such as mono-, di- and triethanolamine, mono-, di- and triisopropylamine, methylethanolamine, dibutylethanolamine, phenyldiethanolamine, di(2-ethylhexyl)ethanolamine, dimethylisopropanolamine, dibutylisopropanolamine, and the like; and mixtures thereof. Presently preferred compounds include diethylene glycol and triethanolamine and mixtures thereof.

Polarizing agents selected from among solid nitrile rubbers, polychloroprene polymers and carbon black are not suitable for use in the applications envisioned in the instant invention because compositions containing such agents do not flow readily under the low molding pressures utilized in the process of this invention.

Any high grade silica, such as those commercially available, is suitable for use in the sensitizer compositions of this invention. The particle size of the silica, although not a critical parameter, usually falls in the range of about 0.005 to about 10 microns. A particularly preferred silica additive is HiSiL ® 233 a precipitated, hydrated silica, finer than 325 mesh, distributed by PPG Industries, Inc., Pittsburg. Pa.

A number of sensitizer formulations are possible within the scope of this invention. Usually the amount of each of the polarizing agents—two different polarizing agents are used in the formulation—is in the range of about 10 to about 50 weight percent, preferably in the range of about 20 to about 30 weight percent. Silica when present, is usually used in the range of about 20 to about 75 weight percent, preferably about 30 to about 50 weight percent. The plastomer, which is an optional additive and, therefore, may not be present at all, can, when used, be present in the amount of any finite amount up to about 40 weight percent, preferably in the range of about 10 to about 20 weight percent. Each of the two types of polarizing agents are present in the sensitizing compounds in any ratio depending on the formulation of the composition.

In the most particularly preferred embodiment of this invention, the sensitizer concentrate consists of about 15 weight percent Solprene ® 475, 25 weight percent triethanolamine, 25 weight percent Carbowax ® 540 and 35 weight percent silica (HiSil ® 233). These compounds are described in the footnotes of Table I. In general, but in particular with this most preferred embodiment, the sensitizer compositions provide good response to microwave energy, incorporate well in the thermoplastic compositions and afford a higher degree of transparency to the molded compositions compared to otherwise similar compositions prepared by adding the sensitizing components separately to a recipe.

It has been found that to obtain the sensitizer concentrate in the form of a free-flowing dry powder that can be readily dry blended with the other components of a thermoplastic molding composition it is necessary to charge the plastomer, when used, and silica to an operating mixer and then add to it a liquid mixture consisting of the melted glycol and alcohol amine. Unless this order of addition is followed, caking or coating of the mixing chamber or mixing blades usually occurs and there is not a clean discharge of product from the mixing chamber.

Sufficient polarizing agent is included in the molding compositions of the instant invention to insure that they will be heat softened quickly when placed in a microwave field. Generally, the total amount of polarizing agent utilized in the molding composition ranges from about 0.5 to about 20 parts by weight per 100 parts by weight thermoplastic elastomer and more preferably from about 1 to about 20 parts by weight for reasons of economy coupled with adequate response to the microwaves. Heating times employed are selected to achieve rapid softening of the compositions to moldable consistency without deleterious effects caused by local overheating. Generally, the heating times used can range from about 2 seconds to about 4 minutes. From a commercial standpoint, however, heating times ranging from about 4 to about 55 seconds are employed to obtain favorable production rates and this is a preferred range.

Other components used as additives to the molding composition in preparation of the instant invention include odorants, colorants and fillers, e.g., silica, clay, silicates, e.g., Wollastonite, calcium carbonate, glass beads and fibers, and the like. Plasticizing agents compatible with the thermoplastic elastomer and other resinous polymers can be employed if desired. Examples of these include naphthenic petroleum oils, e.g., ASTM type 104A, esters of adipic acid, phthalic acid, etc. Processing aids include the metal stearates, e.g., calcium stearate, zinc stearate, silicones, natural and synthetic waxes, and the like. Antioxidants and UV stabilizers can be added as desired from suitable commerically available materials. Exemplary of these include thiodipropionic esters, e.g., dilaurylthiodipropionate, hindered phenolic antioxidants, e.g., 2,6-di-t-butyl-4-methylphenol, octadecyl[3-(3,5-di-t-butyl-4-hydroxyphenyl)]-propionate, thiodiethylene bis(3,5-di-t-butyl-4-hydroxy) hydrocinnamate, etc., and UV stabilizers such as 2(2'-hydroxy-5'-methylphenyl) benzotriazole, 2-hydroxy-4-n-octoxybenzophenone, [2,2'-thiobis(4-t-octylphenolato)]-n-butylamine-nickel(II), etc. Generally, the amounts of the various components in parts by weight per 100 parts by weight thermoplastic elastomer (php) will be as follows: filler, 10 to 600 php, plasticizing agent 20 to 200 php; antioxidant, 0.1 to 2 php, and UV stabilizer, 0.1 to 3 php.

The molds employed in shaping the invention compositions are generally constructed from low cost, relatively low strength materials including silicone rubber, polysulfide rubber, polyurethane, plaster, cast aluminum, and the like. The nature of the mold is dependent upon the molding process used. If the invention composition is placed within the mold and the entire assembly is preheated by microwave energy, it is preferred that the mold used be made of a material such as silicone rubber that has a lower dielectric loss factor than the invention composition. It is within the scope of this invention to preheat the composition in a low dielectric loss container such as glass or ceramic and transfer it to a mold constructed from metals and the like for the actual shaping step. Generally, the composition is placed within a silicone rubber mold, the mold top is covered with a silicone sheet or a release paper, e.g., paper or the like covered with a release agent such as a silicone, and the assembly is placed between the plates of a high frequency electrical field which form a part of commercially available molding machines. The top plate is lowered to contact the release paper covering the mold and the composition is preheated by application of microwave energy for a desired length of time. After the preheating, sufficient pressure is employed to compression mold the composition, e.g., about 10 to about 200 psig (68.9–1380 kPa), for a period of time generally ranging from about 0.1 to about 10 times the preheating time. The pressure is released, the assembly is preferably placed in a separate zone for cooling the mold and contents, after which the molded article is removed. A rotary table or the like containing a plurality of molds can be employed to provide molded parts at commercially attractive rates. Separation of the heating and cooling zones speeds production and reduces consumption of power and water.

EXAMPLE 1

Preparation of Sensitizer Concentrate

The components making up the sensitizer concentrate were blended together in a Welex high speed mixer, Model 8M, 3 liter capacity (Welex, Inc., Blue Bell, Pa.) at ambient conditions at a rotor speed of 1200 RPM for 1½ minutes total mixing time. Mixers of this type (Papenmeier) are described in the Encyclopedia of Polymer Science and Technology 14, 428–430 (1971).

Each charge to the mixer consisted of 225 grams Solprene® 475 plastomer, 375 grams of triethanolamine, 375 grams of polyethylene glycol (Carbowax 540, see footnote 7, Table 1), and 525 grams of granulated silica (HiSil® 233, see footnote 5, Table 1). To obtain a dry, free-flowing product, it was found necessary to charge the granulated plastomer and silica to the operating mixer and then added to it a liquid mixture consisting of the melted polyethylene glycol and triethanolamine at a temperature of about 110° F. (43° C.). The product formed during the mixing procedure did not cake or coat the mixing chamber or mixing blades and discharged cleanly as a dry, free flowing powder.

Other mixing procedures and charge variations were tried and generally found to be less efficient. That is, coating of equipment and caking of product usually resulted in the mixer and in the discharged product.

EXAMPLE 2

A series of thermoplastic elastomer compositions was prepared, converted into sheets about 0.1 inch (0.25 cm) thick by means of a roll mill, and compression molded, after exposure to microwave energy, into slabs having approximate dimensions of 6×7×0.085 inches (15×18×0.2 cm). A silicone rubber mold and a Compo Industries Model J machine was employed having an output of about 10 kw and a microwave frequency in the 40 MHz range.

The basic recipe, practically unresponsive to microwave energy, consisted of several butadiene/styrene block copolymers, poly(alpha-methylstyrene), silica processing agents and stabilizing agents. A control composition was prepared by adding triethanolamine and a polyethylene glycol to the basic recipe. Invention compositions were prepared by adding a suitable amount of the sensitizer concentrate to the basic recipe.

The recipes employed, in parts by weight in grams of each component, and molding results obtained are presented in Table 1.

TABLE 1

| Sensitizer Concentrate in Flow Molding Compositions | | | | |
|---|---|---|---|---|
| Run No. | 1 | 2 | 3 | 4 |
| Remarks | control | invention | invention | control |
| B/S block copol[1] | 40 | 40 | 40 | 40 |
| B/S block copol[2] | 90 | 90 | 90 | 90 |
| Poly (α-methylstyrene)[3] | 40 | 40 | 40 | 40 |
| Naphthenic oil[4] | 20 | 20 | 20 | 20 |
| Silica[5] | 10 | 10 | 10 | 10 |
| Zinc Stearate | 0.3 | 0.3 | 0.3 | 0.3 |
| Stabilizer[6] | 0.5 | 0.5 | 0.5 | 0.5 |
| Polyethylene glycol[7] (polarizing agent) | 2 | 0 | 0 | 0 |
| Triethanolamine (polarizing agent) | 2 | 0 | 0 | 0 |
| Sensitizer concentrate 1[8] | 0 | 8 | 0 | 0 |
| Sensitizer concentrate 2[9] | 0 | 0 | 8 | 0 |
| Total parts by weight | 204.8 | 208.8 | 208.8 | 200.8 |
| Moldability after 10 seconds | fair | excellent | excellent | incomplete |

TABLE 1-continued

| | Sensitizer Concentrate in Flow Molding Compositions | | | |
|---|---|---|---|---|
| Run No. | 1 | 2 | 3 | 4 |
| Remarks | control | invention | invention | control |
| | | | | flow |

Notes:
(1) Solprene ® 480, 70/30 butadiene/styrene block copolymer having a weight average molecular weight of 300,000 containing 50 parts by weight naphthenic oil per 100 parts polymer, Phillips Petroleum Co., Bartlesville, OK.
(2) Solprene ® 411, 70/30 butadiene/styrene block copolymer having a weight average molecular weight of 300,000, available from Phillips Petroleum Co., Bartlesville, OK.
(3) linear homopolymer of α-methylstyrene having as ASTM D 36 melting point of 210° F. (99° C.), Amoco Chemicals Corp., St. Paul, Minn.
(4) naphthenic petroleum oil, ASTM type 104A, Exxon Co., Houston, Tex.
(5) HiSil ® 233, precipitated, hydrated silica, finer than 325 mesh, PPG Industries, Inc., Pittsburg, Pa.
(6) Mark ® 1589B, Argus Chemical Corp., Brooklyn, N.Y.
(7) Carbowax ® 540, solid polyethylene glycol having a molecular weight of about 540.
(8) made according to recipe and process given in Example 1, 8 grams contains 2 grams of each polarizing agent, 2.8 grams of silica described under footnote (5) and 1.2 gram of Solprene ® 475. (Solprene ® 475 is a 60/40 butadiene/styrene block copolymer having a weight average molecular weight of 250,000 containing 50 parts by weight naphthenic oil per 100 parts by weight polymer.)
(9) another batch of sensitizer concentrate made according to recipe and process given in Example 1.

Inspection of the molding results given in Table 1 shows that the compositions prepared with the sensitizer concentrate in invention runs 2, 3 exhibit excellent molding characteristics under the conditions employed. The control composition of run 1 containing the same amounts of polarizing agents added separately during compounding, in contrast, exhibits only fair moldability under the same molding conditions. The control composition of run 4 exhibits poor moldability under the same molding conditions, e.g., particles of the granulated starting material are clearly visible and incomplete fusing is evident. In addition, visual inspection of the samples of runs 1, 2 and 3 when placed on a printed background showed that the samples of invention runs 2, 3 were more transparent than the sample of run 1.

We claim:

1. A composition of matter which on addition to a non-polar thermoplastic composition is suitable for sensitizing said thermoplastic composition to the heating effects of microwave energy, said composition comprising an admixture of (1) from about 10 to about 50 weight percent of simple and polymeric alkylene glycols and their mono- and dialkyl esters, (2) about 10 to about 50 weight percent of ethanolamines isopropanolamines and their hydrocarbyl-substituted derivatives, (3) about 20 to about 75 weight percent silica and (4) a linear or radial teleblock copolymer plastomer derived from butadiene and styrene in which the butadiene to styrene ratio can vary from about 85:15 to about 55:45 parts by weight said plastomer in an amount ranging from a finite amount up to about 40 weight percent.

2. A composition of claim 1 wherein the compounds derived from alkylene glycols are chosen from among ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, polyethylene glycols having weight average molecular weights ranging from about 200 to about 6,000; polypropylene glycols having weight average molecular weights ranging from about 400 to about 2,000; mixed poly(ethylene)-poly(propylene) glycols having average weight molecular weights ranging up to about 6,000 and containing from about 30 to about 90 weight percent ethylene oxide; the monomethyl, monoethyl and monobutyl ethers of ethylene glycol, propylene glycol and diethylene glycol; the monomethyl and monoethyl ethers of triethylene glycol; the dimethyl and diethyl ethers of diethylene glycol, dipropylene glycol and trimethylene glycol; and the derivatives of ethanolamine and propanolamine are chosen from among mono-, di- and triethanolamine, mono-, di- and triisopropylamine, methylethanolamine, dibutylethanolamine, phenyldiethanolamine, di(2-ethylhexyl) ethanolamine, dimethylisopropanolamine, dibutylisopropanolamine, and mixtures thereof.

3. A composition of claim 1 wherein the compound of (1) is polyethylene glycol, the compound of (2) is triethanolamine, the compound of (3) is a precipitated, hydrated silica; and the plastomer is a 85:15 to 45:55 butadiene/styrene block copolymer having a weight average molecular weight of about 250,000 containing about 50 parts by weight naphthenic oil per 100 parts by weight polymer.

4. A method for preparing a flow molded object comprising subjecting a composition of claim 3, in a mold, to microwave energy for a time sufficient to cause the composition to assume the molded shape.

5. A flow molded object made by the method of claim 4.

6. A method for preparing a dry, free-flowing composition of claim 6 comprising:
  (1) charging granulated plastomer and silica to a mixer in operation to obtain a first mixture;
  (2) preparing a mixture of components (1) and (2) at temperatures sufficient to obtain a liquid; and
  (3) charging said liquid mixture to said first mixture in a mixer in operation thereby obtaining a free-flowing, dry composition.

7. A method for preparing flow molding compounds comprising admixing non-polar thermoplastic with a sufficient amount of a composition of claim 1 to provide microwave energy sensitivity.

8. A method of claim 7 wherein other additives chosen from among odorants, colorants and fillers are admixed in the flow molding compound compositions.

9. A method for preparing a flow molded object comprising subjecting a composition of claim 1, in a mold, to microwave energy for a time sufficient to cause the composition to assume the molded shape.

10. A flow molded object made by the method of claim 9.

11. A composition of claim 1 comprising about 20 to about 30 weight percent of component (1), about 20 to about 30 weight percent of component (2) and about 30 to about 50 weight percent of component (3).

12. A method for preparing flow molding compounds comprising admixing non-polar thermoplastic with a sufficient amount of a composition of claim 11 to provide microwave energy sensitivity.

13. A method of claim 12 wherein other additives chosen from among odorants, colorants and fillers are admixed with the flow molding compositions.

14. A composition of matter comprising non-polar thermoplastic and a sufficient amount of a premixed composition of claim 1, 3 or 11 to provide microwave sensitivity.

15. A composition of matter of claim 14 also comprising other additives chosen from among odorants, colorants and fillers.

* * * * *